United States Patent
Alden et al.

[15] 3,702,475
[45] Nov. 7, 1972

[54] SEARCH-TRACK DECISION CIRCUIT FOR DISTANCE MEASURING EQUIPMENT

[72] Inventors: John R. Alden, Olathe; John L. Aker, Chanute, both of Kans.

[73] Assignee: King Radio Corporation

[22] Filed: Aug. 28, 1970

[21] Appl. No.: 67,945

[52] U.S. Cl. .................................. 343/7.3, 343/5 DP
[51] Int. Cl. ........................... G01s 9/14, G01s 9/56
[58] Field of Search ........................... 343/5 DP, 7.3

[56] References Cited

UNITED STATES PATENTS

3,631,487  12/1971  Huntsinger et al. ........ 343/7.3

Primary Examiner—T. H. Tubbesing
Attorney—Scofield, Kokjer, Scofield & Lowe

[57] ABSTRACT

A DME having means for facilitating the rapid identification of its own replies from a plurality of received replies sequentially tests only the time/distance corresponding to the next occuring reply pulse received and uses a two counter digital concept to count both valid and invalid replies in making the decision to switch from the search mode to the track mode of operation.

12 Claims, 1 Drawing Figure

PATENTED NOV 7 1972
3,702,475
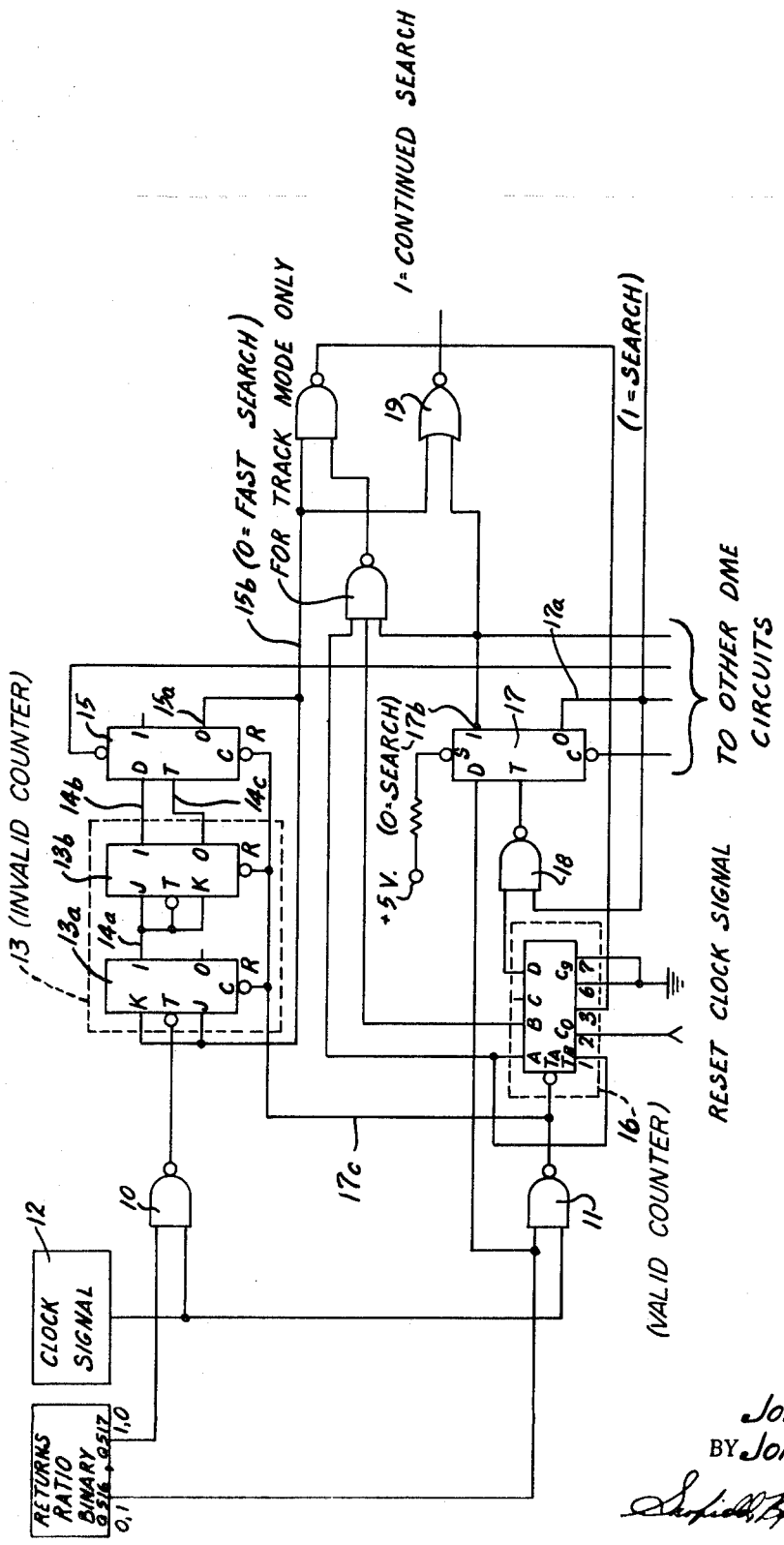
INVENTORS
John R. Alden
BY John L. Aker
ATTORNEYS

SEARCH-TRACK DECISION CIRCUIT FOR DISTANCE MEASURING EQUIPMENT

BACKGROUND AND BRIEF DESCRIPTION OF THE INVENTION

A digitally operated DME was described in the John L. Aker U.S. Pat. No. 3,412,400. A second Aker U.S. Pat. No. 3,456,257 described a rapid search DME that was digitally operated and specifically detailed the operation of search-track decision circuitry common to both patents.

The search mode of operation discussed in the '257 patent causes the DME to search automatically each time that same is initially tuned to a new ground-beacon channel or if there is some major interruption in the radio signal. The DME scans, progressively, each received reply by means of a sliding "range gate" or "-time slot" (corresponding to the production of a marker) which quickly tests each slot position for a number of successive reply pulses received within a certain uniform checking period. If no replies (or only sporadic replies) are received, the time slot is immediately advanced to the next received reply and so on. When, at some particular time interval, safe evidence of recurrent replies is detected, the search is completed and stopped, since the condition is fulfilled only by reception of a desired number of reply pulses. These pulses are the only ones which are received within the same time relationship to the given airplane's own randomly jittered interrogation pulses.

Thereafter, the DME is caused to "lock" onto the proper pulses and to transfer over to the "track" operation. The term "track" is used to indicate that the delay setting of the timing circuits automatically and continuously follows any normal variation in time delay of the proper reply pulses. Such variations will occur if the airplane's distance is actually changing as a result of its flight path, but are necessarily very small because of the relationship between the interrogation rates and actual airplane speeds.

The present invention relates particularly to a digital search-track decision circuitry. This circuitry is comprised of an "invalid" divide by 4 counter and a "valid" divide by 10 counter which are interconnected with a returns ratio binary similar to that described in the two Aker patents mentioned above. Alternately, any circuit whose output indicates either the reception of a valid or invalid reply may be used with the two counters. (A valid reply corresponds to a received reply occurring within the effective width of the range gate while an invalid reply corresponds to the absence of a reply corresponds to the absence of a reply effectively occurring within the range gate). The signal indicative of an invalid reply is gated with a clock signal to the invalid counter while the signal indicative of a valid reply is gated with the same (or a related) clock signal to a valid counter. However, the output of the valid gate (which is also the input to the valid counter) is also connected with the reset terminals on the invalid counter. Accordingly, four consecutive (uninterrupted by a valid reply) invalid replies must be received before the invalid counter will have an output. Conversely, the valid counter will have an output and effect the operational mode change from search to track when 10 valid replies are received prior to the reception of the four consecutive invalid replies mentioned above since each valid reply increases the number of counts in the valid counter and resets the invalid counter to zero.

It has been found that the above-numerical correlation between the two counters and the particular count capacities involved optimizes the benefits of the digital approach to search-track decision and minimizes the possibility of locking onto a spurious signal.

An object of the invention is to provide a uniquely constructed search-track decision circuit for Distance Measuring Equipment (DME).

Another object of the invention is to provide a search-track decision circuit of the character described which minimizes the possibility of false "lock-ons." It is a feature of the invention that "lock-on" or the decision to switch from the search mode of operation to the track mode of operation may be achieved well within the acquisition time required by ARINC specifications and even with returns ratio signal significantly below that required by ARINC.

A further object of the invention is to provide a digitally operated search-track decision circuit in a DME which optimizes the decision making process by observing the returns ratio obtained each time the range gate is stopped. Further, the observation time is made a function of the returns ratio and decision as to the switching of operating modes is quickly reached regardless of whether very high or very low returns ratios are present. There is, however, a requirement for more interrogations before reaching a decision with intermediate returns ratios.

A further object of the invention is to provide a uniquely constructed search-track decision circuitry for the DME's which is more stable and not subject to long term drift. It is a feature of the invention that the search-track decision circuitry operates in conjunction with digital techniques as opposed to analog thereby insuring that all production units are substantially identical in performance without normal variations due to production tolerances as normally occurs in analog equipment.

A still further object of the invention is to provide a search-track decision circuit for use with DMEs which is digitally operated and in which the reliance on the returns ratio from a DME's own interrogation is substantially decreased as same relates to the probability of acquiring "lock-on."

Other and further objects of the invention, together with the features of novelty appurtenant thereto, will appear in the course of the following description.

DETAILED DESCRIPTION OF THE INVENTION

In the accompanying drawing, which forms a part of the specification, and is to be read in conjunction therewith, and in which like reference numerals indicate like parts in the various views:

The single FIGURE is a circuit diagram of a search-track decision circuit of body features of our invention.

As discussed in Aker U.S. Pat. No. 3,456,257, when a received pulse (during search) falls within 15 microseconds on either side of a marker produced by the DME disclosed therein, the DME has no way of discriminating on the basis of one interrogation as to whether a valid reply has been received. Accordingly, the search process described in the '257 patent was stopped at that particular distance for four interrogation cycles. The use of four interrogation cycles was purely arbitrary, however, it was found to operate satisfactorily with the basic analog characteristics of search-track decision circuitry also disclosed therein.

It is, however, important in the following description to understand that the DME classified the mutual occurence of a received reply and the time occurence of the range gate (marker in the '257 patent) as a potentially valid reply. The above-described occurence will cause a positive signal on the return line and will set the returns ratio binary (Q516, Q517) for the first time (see FIG. 21 in the '257 patent, supra). Accordingly, the output of the returns ratio binary will be indicative of the reception of either a valid or invalid reply. For example, if no replies have been received within the time for a range gate production, the output of the returns ratio binary that is connected with an invalid gate will be equal to the logic 1 of a possible binary output 1 or 0. Conversely, the returns ratio binary output that interconnects with a valid gate will be the binary output 0. Any pulse that falls within the effective width of the range gate sets the binary so that the 1 now appears on the valid gate and the 0 appears on the invalid gate as will be discussed.

The FIGURE shows the returns ratio binary (Q516, Q517) has one of its outputs connected with NAND gate 10 which corresponds to the invalid gate. The other output from the returns ratio binary is connected to the input of NAND gate 11 which corresponds to the valid gate. A clock signal which is diagrammatically represented as emanating from source 12 is delivered in parallel to the inputs of both NAND gates 10 and 11 and operates to put a one or two microsecond 1 going pulse on the inputs of the NAND gates 10 and 11. Depending upon the condition of the returns ratio binary, a 1 or 2 microsecond 0 going pulse will appear at the output of gate 10 or 11.

The output of the invalid NAND gate 10 is directed to the input of the invalid "divide by 4" counter. This counter is comprised of two cascaded J-K flip-flops each being capable of dividing by two in a simple ripple through connection. Also each of the J-K's 13a and 13b has a reset terminal indicated by the letter R on the lower portion thereof. The invalid counter, hereinafter identified by the numeral 13, is constructed so that if a logic 0 appears on reset terminals R, the flip-flops 13a and 13b are cleared or reset so that the output lines 14a and 14b from the two flip-flops are returned to a logic 0 state regardless of their prior conditions. When the J-K input connection on the first flip-flop 13a is a logic 1 enabling the J-K input so that every time that the T input makes a 1–0 transition from the output of NAND gate 10, flip-flop 13a changes state. That is to say that the 1 output on output terminal 14a changes state each time the input is clocked. The second flip-flop 13b is connected to the output of the first flip-flop so that when the first flip-flop's output (on its terminal 14a) changes from a 1 to a 0 with every other clocked input entering therein, the second flip-flop 13b is caused to change its state. The connection of the J and the K inputs to the toggle input merely parallels internal connections and accomplishes the connection of those remaining J-K inputs. It should be pointed out that a counter for counting interrogations could be substituted for invalid counter 13 since interrogations minus valid counts would be equal to the invalid counts.

The output of flip-flop 13b and 14b and 14c is connected to the D-T input terminals of an integrated circuit fast search flip-flop identified by the numeral 15. These connections operate flip-flop 15 so that when the flip-flop 13b makes a 1–0 transition on its output terminal 14b, terminal 15a on flip-flop 15 goes from a 1 to a 0 thereby placing the 0 on the line hereinafter identified as "0 = fast search" line or line 15b.

Accordingly, the "0 = fast search" condition on line 15b is then fed back to the J-K inputs of the first flip-flop 13a to stop any further counting by invalid counter 13 in the track mode of operation.

The valid counter hereinafter identified by the numeral 16 is a conventional integrated circuit decade counter capable of dividing by 10. As mentioned above, the output from the valid NAND gate 11 is a 0 going pulse of a 1 or 2 microseconds duration. The output occurs when a 1 output condition appears on the valid terminal of the returns ratio binary (Q516, Q517), and when same is gated through NAND gate 11 with the clock signal 12. The pulsed output from gate 11 begins to clock the valid counter on the 1–0 transition. The same pulse resets the invalid counter via line 17c which interconnects with the reset terminals R on both flip-flops 13a and 13b of the invalid counter 13 during the duration of the negative going pulse mentioned above. The D output from the valid counter 16 is coupled to the input of the search/track flip-flop 17 through NAND gate 18. The other input to NAND gate 18 is connected to the "1 = search" output from the search/track flip-flop and identified by numeral 17a. When the D output of the divide by 10 valid counter 16 goes high, the output of NAND gate 18 goes low. When the D output goes low, the output of NAND gate 18 returns to the high condition and clocks the input T of search/track flip-flop 17.

If the D input to the search/track flip-flop 17 is high (a condition corresponding to a received valid pulse from the returns ratio binary Q516, Q517), then the output at 17b of the search/track flip-flop 17 will go to a logic 1 and conversely, the output on output 17a will go to a logic 0. As suggested above, this logic 0 on output 17a is identified as "1 = search" (line 17a) and will be a 1 when the search/track flip-flop 17 is in the search state. The 0 condition on terminal 17a indicates that the search/track flip-flop is in the track state and is being fed back to the input of NAND gate 18 to disable same to further changes in state of the valid counter. Since the DME has now gone into the track mode of operation, and as there are other ways of returning to the search mode of operation, the need for the search/track decision criteria including the valid-invalid indication from the returns ratio binary to effect the search/track flip-flop 17 is no longer needed. Stated another way, NAND gate 18 is disabled after the decision is made to go from search to track. However, the search/track flip-flop may be used by various other circuits throughout the DME ranging system to determine whether the DME is reacting in the search mode or the track mode of operation.

Finally, fast search flip-flop 15 mentioned above may be considered to establish two different substates within the search state. Either flip-flop 15 is in the fast search substate (when the range gate is moved in distance or in time relative to the DME's own interrogation) or in the decision substate (when the DME is waiting to make a decision or waiting for a decision to come out of the valid-invalid search-track decision counter discussed above). For instance, when a logic 1 appears on output terminal 15a, the fast search flip-flop is in the decision substate. When terminal 15a is a logic 0, the unit is in the fast search substate. When the fast search substate, the 0 appearing on line 15b is gated through gate 19 and is combined with a signal identified as "0 = search" (line 17b). This condition is identified as the "one = continue search" for the unit and combines with other gates and circuitry to cause the range gate to be moved outward in range during the next interrogation cycle as described in the Aker '257 patent.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawing is to be interpreted as illustrative and not in a limiting sense.

Having thus described our invention, we claim:

1. In a DME of the type adapted to transmit interrogation pulses and to receive replies from a transponder, said replies being either in response to said transmitted interrogation pulses or replies which originate in response to other interrogations from other DME units or squitter reply pulses, said DME having a search mode of operation and a track mode of operation, the improvement comprising
    said circuit including a digital counting means, said counting means being operable to count a number of valid replies and a number of one of said invalid replies and interrogations, said counting means having a first output when a preselected state is reached corresponding to the counting of said number of one of said invalid replies and said interrogations, said first output operable to maintain said DME and said search mode of operation, said counting means having a second output when a preselected state is reached corresponding to the counting of said number of valid replies, said second output being operable to switch said DME from the search mode to the track mode of operation.

2. In a DME of the type adapted to transmit interrogation pulses and to receive replies from a transponder, said replies being either in response to said transmitted interrogation pulses or replies which originate in response to other interrogations from other DME units or squitter reply pulses, said DME having a search mode of operation and a track mode of operation, the improvement comprising
    said circuit including a digital counting means, said counting means being operable to count both valid and invalid replies, said counting means having a first output when a preselected state is reached corresponding to the counting of invalid replies, said first output operable to maintain said DME in said search mode of operation, said counting means having a second output when a preselected state is reached corresponding to the counting of valid replies, said second output being operable to switch said DME from the search mode to the track mode of operation.

3. In a DME of the type adapted to transmit interrogation pulses and to receive replies from a transponder, said replies being either in response to said transmitted interrogation pulses or replies which originate in response to other interrogations from other DME units or squitter reply pulses, said DME having a search mode of operation and a track mode of operation, the improvement comprising
    a digital search-track decision circuit, said circuit operable to initiate the switching of the DME from the search mode to the track mode, said circuit including at least two counters, one of said counters being operable to count said valid replies and one of said counters being operable to count said invalid replies, said counters having outputs at preselected counts and interconnected so that when said valid counter has counted said preselected count, said circuit operates to switch said DME from the search mode to the track mode of operation, and said invalid counter being operable to maintain said DME in the search mode of operation when same has countered its preselected count.

4. The invention as in claim 3 wherein said circuit includes a means interconnecting said valid counter and said invalid counter for resetting said invalid counter to its original state upon the reception of a preselected number of valid replies.

5. The invention as in claim 4 wherein said preselected number of valid replies is a single reply.

6. The invention as in claim 4 including circuit means for producing said invalid output only after a plurality of consecutive invalid replies have been received by said DME.

7. The invention as in claim 3 wherein said invalid counter has reset terminal, said terminal being operable to reset said invalid counter to its initial state when said terminal is energized in a preselected manner, said valid counter having an input and said output, means interconnecting said valid counter input with said reset terminal, said invalid counter thereby being reset to its initial state each time a valid reply is received by said DME.

8. The invention as in claim 3 including means for producing said invalid counter output only after a plurality of consecutive invalid replies have been received by said DME.

9. The method of making a digital decision switch from a search mode of operation to a track mode of operation in a DME, said method comprising the steps of
    counting a number of valid replies to DME interrogations at a time trial delay representing distance,
    counting a number of invalid replies which are not in response to the DME interrogation, and initiating the switching of said DME from said search mode to said track mode of operation when a preselected number of valid replies have been counted.

10. The method as in claim 9 including the step of resetting said invalid count to its original state each time a valid reply is received by said DME.

11. The method as in claim 10 including the step of maintaining said DME in said search mode of operation after a plurality of consecutive invalid replies have been received by said DME.

12. The invention as in claim 9 including the step of maintaining said DME in said search mode of operation only after a plurality of consecutive invalid replies have been received by said DME.

* * * * *